United States Patent
Zhang et al.

(10) Patent No.: US 10,360,230 B2
(45) Date of Patent: Jul. 23, 2019

(54) METHOD AND DEVICE FOR SOCIAL PLATFORM-BASED DATA MINING

(71) Applicant: BEIJING BYTEDANCE NETWORK TECHNOLOGY CO., LTD., Beijing (CN)

(72) Inventors: Yiming Zhang, Beijing (CN); Tao Chen, Beijing (CN); Huanhuan Cao, Beijing (CN); Lixin Luo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 142 days.

(21) Appl. No.: 15/525,870

(22) PCT Filed: Jul. 10, 2015

(86) PCT No.: PCT/CN2015/083804
§ 371 (c)(1),
(2) Date: May 10, 2017

(87) PCT Pub. No.: WO2016/074492
PCT Pub. Date: May 19, 2016

(65) Prior Publication Data
US 2017/0322981 A1    Nov. 9, 2017

(30) Foreign Application Priority Data
Nov. 10, 2014 (CN) .......................... 2014 1 0645497

(51) Int. Cl.
*G06F 17/30* (2006.01)
*G06F 16/2458* (2019.01)
(Continued)

(52) U.S. Cl.
CPC .......... *G06F 16/2465* (2019.01); *G06F 16/00* (2019.01); *G06F 16/24575* (2019.01); *G06F 16/24578* (2019.01); *G06F 16/9535* (2019.01)

(58) Field of Classification Search
None
See application file for complete search history.

(56) References Cited

U.S. PATENT DOCUMENTS 7,685,192 B1 * 3/2010 Scofield ................ G06F 16/954
                                                              707/709
7,739,231 B2 * 6/2010 Flinn ................. G06F 17/30699
                                                              707/603
(Continued)

FOREIGN PATENT DOCUMENTS

CN   102426686 A   4/2012
CN   102467542 A   5/2012
(Continued)

OTHER PUBLICATIONS

International Search Report from PCT/UCN2015/083804; dated Oct. 13, 2015.
(Continued)

*Primary Examiner* — Hung D Le
(74) *Attorney, Agent, or Firm* — BakerHostetler

(57) ABSTRACT

Provided is a method and device for social platform-based data mining. The method includes: acquiring one or more interest label dictionaries of one or more registered users on an information client and one or more first objects having followed relationship with the one or more registered users on the information client in a social platform; determining one or more first followed sets corresponding to the one or more registered users; constructing an interest model; acquiring one or more second objects having followed relationship with one or more newly registered users on the information and reading relationship information between
(Continued)

the one or more newly registered users and the one or more second objects; determining a second followed set corresponding to the one or more newly registered users; and matching the second followed set with the interest model to determine one or more recommended interest labels of the one or more newly registered users.

21 Claims, 6 Drawing Sheets

(51) Int. Cl.
*G06F 16/9535* (2019.01)
*G06F 16/2457* (2019.01)
*G06F 16/00* (2019.01)

(56) References Cited

U.S. PATENT DOCUMENTS

| | | | | |
|---|---|---|---|---|
| 7,876,214 | B1* | 1/2011 | Brady, Jr. | H04W 4/029 |
| | | | | 340/539.11 |
| 8,060,462 | B2* | 11/2011 | Flinn | G06F 17/30699 |
| | | | | 707/603 |
| 8,060,463 | B1* | 11/2011 | Spiegel | G06Q 30/02 |
| | | | | 707/609 |
| 8,386,488 | B2* | 2/2013 | Jones | G06F 17/30324 |
| | | | | 707/738 |
| 8,515,901 | B2* | 8/2013 | Flinn | G06F 17/30699 |
| | | | | 707/603 |
| 8,768,936 | B2 | 7/2014 | Bao et al. | |
| 2005/0240608 | A1* | 10/2005 | Jones | G06F 17/30324 |
| 2009/0005987 | A1* | 1/2009 | Vengroff | G06Q 30/02 |
| | | | | 701/300 |
| 2009/0082111 | A1* | 3/2009 | Smith | G06Q 30/02 |
| | | | | 463/42 |
| 2010/0228777 | A1* | 9/2010 | Imig | H04L 12/1818 |
| | | | | 707/772 |
| 2012/0290599 | A1* | 11/2012 | Tian | G06F 16/313 |
| | | | | 707/758 |
| 2013/0030950 | A1 | 1/2013 | Leng | |
| 2013/0297590 | A1* | 11/2013 | Zukovsky | G06F 16/951 |
| | | | | 707/722 |
| 2014/0067931 | A1* | 3/2014 | Harik | H04L 67/306 |
| | | | | 709/204 |
| 2014/0108333 | A1 | 4/2014 | Jain et al. | |
| 2014/0330653 | A1 | 11/2014 | Quiu et al. | |
| 2014/0358945 | A1* | 12/2014 | Xie | G06F 17/30997 |
| | | | | 707/748 |
| 2015/0278691 | A1* | 10/2015 | Xia | G06F 16/951 |
| | | | | 706/11 |

FOREIGN PATENT DOCUMENTS

| | | |
|---|---|---|
| CN | 102880691 A | 1/2013 |
| CN | 103810192 A | 5/2014 |
| CN | 103870538 A | 6/2014 |
| CN | 103870541 A | 6/2014 |
| CN | 103995823 | 8/2014 |
| CN | 103995823 A | 8/2014 |
| CN | 104090971 A | 10/2014 |
| CN | 104317959 A | 1/2015 |
| EP | 2249261 A1 | 11/2010 |
| JP | 2018503158 A | 2/2018 |

OTHER PUBLICATIONS

EPC Search Report for 15859244 dated Apr. 18, 2016.
Chinese Search Report for App. No. 2014106454972 dated Nov. 10, 2014.
Supplemental Chinese Search Report for App. No. 2014106454972 dated Nov. 10, 2014.

* cited by examiner

METHOD AND DEVICE FOR SOCIAL PLATFORM-BASED DATA MINING

CROSS-REFERENCE TO RELATED PATENT APPLICATIONS

The present application is a National Stage of International Patent Application No. PCT/CN2015/083804, filed Jul. 10, 2015, and claims the priority of Chinese Patent Application No. 201410645497.2, filed on Nov. 10, 2014, the disclosures of which are incorporated herein by reference in their entirety.

TECHNICAL FIELD

The embodiments of the disclosure relate to the computer field and, more particularly, to a method and device for social platform-based data mining.

BACKGROUND

At present, with the development of the computer technology and the gradual popularization of the Internet, more and more people acquire a variety of information through the Internet. And correspondingly, the amount of information on the Internet has become more abundant with the development of the computer technology and the popularity of the Internet.

In recent years, with the rapid development of mobile Internet, people have gradually been accustomed to acquiring information content through the information client on the mobile terminal. In this way, the time that a user acquires information through the network becomes more fragmented. In this context, how to accurately provide users with valuable information that users are interested in becomes more important. In particular, it is an urgent problem to provide new users with valuable and interesting information.

In the traditional technologies, the cold start problem of the recommendation system is a major challenge in the application of the products such as information clients. Herein the cold start problem of the recommendation system refers to the fact that the new user system lacks sufficient data for capturing effective recommended content that users are interested in. There is a widely used method in a number of solutions to the problem, that is, encouraging users to login the recommendation system with a Social Network Service (SNS) account, for example: login with a social account such as microblog, Tencent QQ and Renren. The recommendation system can use the information of a user in a social platform (for example, followed relationship, a friend relationship, an interest label, published content, etc.) to initialize the interest model of the user to make effective recommendation.

On the one hand, there are still a lot of difficulties in using public data from a social platform for content recommendation (public data, such as video, articles, pictures, music, games, software, friends, etc.) in the practical application. For example, the published content of the social platform is often shorter and messy, the label content of a user is often unconventional (such as: aliens will die without sleeping late, intensive phobia late patients, etc.), it is more difficult to understand by a machine learning algorithm and it is limited in helping improve the recommended service. For users who are not active on the SNS and have weak social relationships, public data on their SNS platforms is more limited in improving the recommendation effect. On the other hand, a mature content recommended service provider with a larger number of users often has accumulated a lot of user behavior information in the long-term operation process, such as: on-demand video and articles read or commented by the user. If this part of data may be effectively integrated and used with the public data of the SNS, it is possible to greatly improve the recommendation effect of the user. However, the existing technology basically focuses on the use of the public data provided by the SNS platform to mine a user interest model and recommend. It is difficult to achieve this method, and the accuracy is low.

There is no effective solution for the problem in the traditional art that targeted information cannot be provided because a newly registered user has no historical browsing record.

SUMMARY

The main object of the embodiments of the disclosure is to provide a method and device for social platform-based data mining for solving the problem in the traditional art that targeted information cannot be provided because a newly registered user has no historical browsing record.

In order to achieve the above object, according to an aspect of an embodiment of the disclosure, there is provided a method for social platform-based data mining. The method includes: acquiring one or more interest label dictionaries of one or more registered users on an information client; acquiring one or more first objects having followed relationship with the one or more registered users on the information client in a social platform and reading the relationship information between the one or more registered users and the one or more first objects; according to the one or more first objects having the followed relationship with the one or more registered users, determining one or more first followed sets corresponding to the one or more registered users; according to the one or more interest label dictionaries of the one or more registered users and the one or more first followed sets, constructing an interest model, wherein the interest model is used to characterize a corresponding relationship between the one or more registered users having the same first followed set and an interest label; acquiring one or more second objects having followed relationship with one or more newly registered users on the information client in the social platform, and reading relationship information between the one or more newly registered users and the one or more second objects; according to the one or more second objects having the followed relationship with the one or more newly registered user, determining a second followed set corresponding to the one or more newly registered users; and matching the second followed set with the interest model to determine one or more recommended interest labels of the one or more newly registered users according to the interest model.

In order to achieve the above object, according to another aspect of an embodiment of the disclosure, there is provided a device for social platform-based data mining. The device includes: a first acquiring component arranged to acquire one or more interest label dictionaries of one or more registered users on an information client; a second acquiring component arranged to acquire one or more first objects having followed relationship with the one or more registered users on the information client in a social platform and read the relationship information between the one or more registered users and the one or more first objects; a first determining component arranged to, according to the one or more first objects having the followed relationship with the one or more registered users, determine one or more first followed sets corresponding to the one or more registered users; a first processing component arranged to, according to the one or more interest label dictionaries of the one or more registered users and the one or more first followed sets, construct an interest model, wherein the interest model is used to characterize a corresponding relationship between the one or more registered users having the same first followed set and an interest label; a third acquiring component arranged to acquire one or more second objects having followed relationship with one or more newly registered users on the information client in the social platform, and read relationship information between the one or more newly registered users and the one or more second objects; a second determining component arranged to, according to the one or more second objects having the followed relationship with the one or more newly registered user, determine a second followed set corresponding to the one or more newly registered users; and a second processing component arranged to match the second followed set with the interest model to determine one or more recommended interest labels of the one or more newly registered users according to the interest model.

According to an embodiment of the disclosure, by acquiring one or more interest label dictionaries of one or more registered users on an information client; acquiring one or more first objects having followed relationship with the one or more registered users on the information client in a social platform and reading the relationship information between the one or more registered users and the one or more first objects; according to the one or more first objects having the followed relationship with the one or more registered users, determining one or more first followed sets corresponding to the one or more registered users; according to the one or more interest label dictionaries of the one or more registered users and the one or more first followed sets, constructing an interest model, wherein the interest model is used to characterize a corresponding relationship between the one or more registered users having the same first followed set and an interest label; acquiring one or more second objects having followed relationship with one or more newly registered users on the information client in the social platform, and reading relationship information between the one or more newly registered users and the one or more second objects; according to the one or more second objects having the followed relationship with the one or more newly registered user, determining a second followed set corresponding to the one or more newly registered users; and matching the second followed set with the interest model to determine one or more recommended interest labels of the one or more newly registered users according to the interest model, the problem in the traditional art is solved that targeted information cannot be provided because a newly registered user has no historical browsing record, and the effect is achieved for providing targeted information for users through the followed relationship of the newly registered users in the social platform.

BRIEF DESCRIPTION OF THE DRAWINGS

The drawings forming a part of the embodiments of the disclosure are described here to provide further understanding of the embodiments of the disclosure. The schematic embodiments and description of the disclosure are adopted to explain the embodiments of the disclosure, and do not form improper limits to the embodiments of the disclosure. In the drawings.

DETAILED DESCRIPTION OF THE EMBODIMENTS

It is to be noted that the embodiments of the disclosure and the characteristics in the embodiments may be combined with each other under the condition of no conflicts. The embodiments of the disclosure are described below with reference to the drawings and the embodiments in detail.

In order to make a better understanding of the solution of the embodiments of the disclosure by those skilled in the art, the technical solutions in the embodiments of the disclosure will be described clearly and completely in conjunction with the accompanying drawings in the embodiments of the disclosure, and it will be apparent that the described embodiments are merely a part of the embodiments of the disclosure rather than all embodiments. All other embodiments acquired by those of ordinary skill in the art without making creative work are intended to be within the scope of protection of the embodiments of the disclosure, based on embodiments of the disclosure.

It is to be noted that the terms such as "a first" and "a second" in the specification and claims of the embodiments of the disclosure and in the above accompanying drawings are used to distinguish similar objects and are not necessarily used to describe a particular order or sequence. It is to be understood that the data thus used are interchangeable where appropriate to enable the embodiments of the disclosure to be described herein. In addition, the terms such as "including", "having" or any other variants thereof are intended to cover a non-exclusive inclusion. For example, a process, method, system, product or device that includes a series of steps or units is not necessarily limited to those explicitly listed steps or units, but may include other steps or units that are not explicitly listed or inherent to these processes, methods, products, or devices.

Embodiment 1

The embodiment of the disclosure provides a method for social platform-based data mining.

Figure 1:
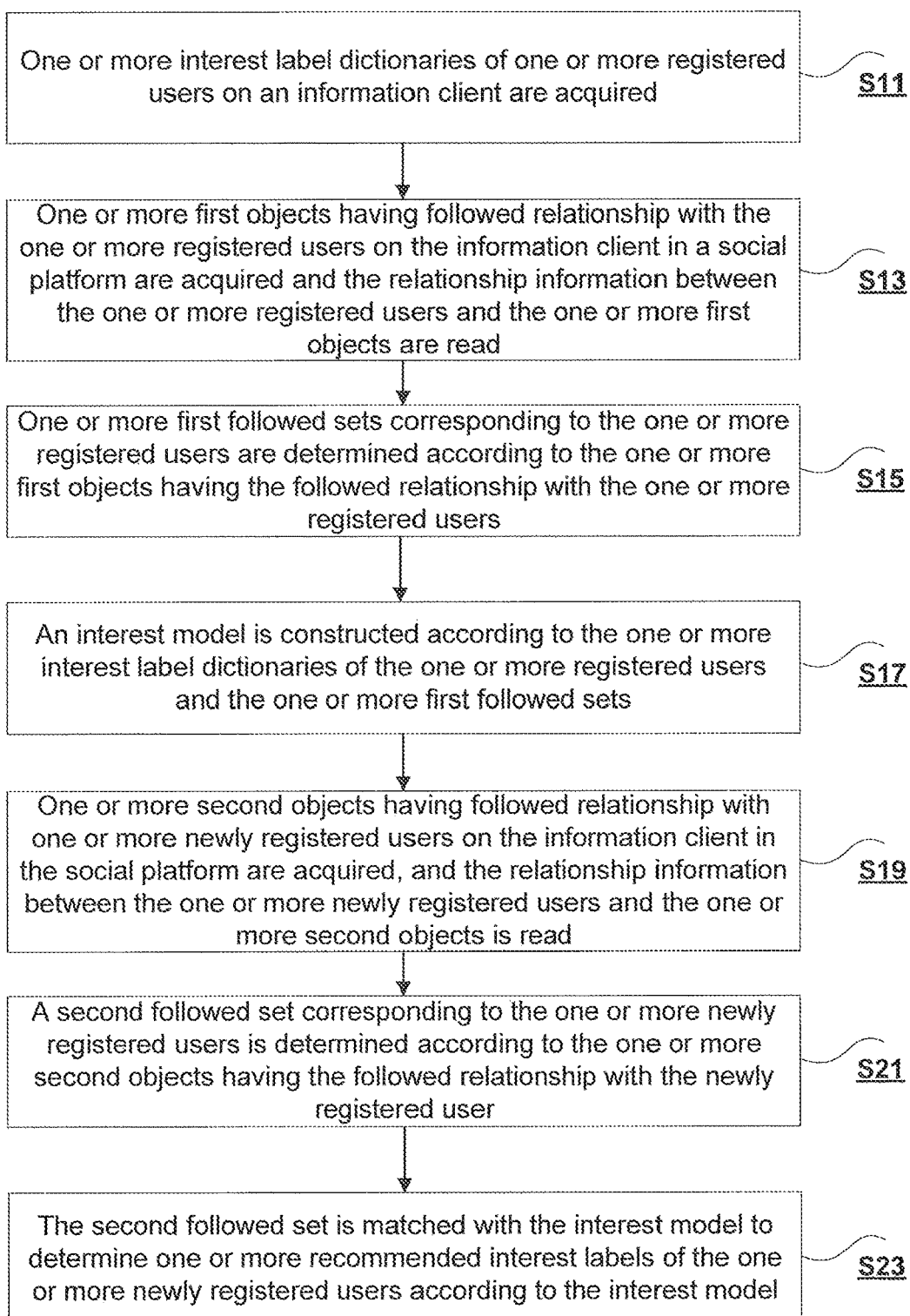
FIG. 1 is a flow diagram of a social platform-based data mining according to a first embodiment of the disclosure.

FIG. 1 is a flow diagram of a social platform-based data mining according to a first embodiment of the disclosure. As shown in FIG. 1, the method includes the following steps.

Step S11: One or more interest label dictionaries of one or more registered users on an information client are acquired.

In the above Step S11 of the disclosure, the one or more interest label dictionaries corresponding to each registered user is analyzed and acquired by collecting the history browsing behavior of the one or more registered users.

Step S13: One or more first objects having followed relationship with the one or more registered users on the information client in a social platform are acquired and the relationship information between the one or more registered users and the one or more first objects are read.

In the above Step S13 of the disclosure, the object having followed relationship with the one or more registered users is determined by reading the followed relationship information of the one or more registered users on the social platform.

In the practical applications, the followed relationship may be a friend relationship in Tencent QQ software, or followed relationship in the microblog, or a friend relationship in Renren.

Step S15: One or more first followed sets corresponding to the one or more registered users are determined according to the one or more first objects having the followed relationship with the one or more registered users.

In the above Step S15 of the disclosure, a first followed set of each registered user is determined by arranging the one or more first objects having the followed relationship with each registered user.

Step S17: An interest model is constructed according to the one or more interest label dictionaries of the one or more registered users and the one or more first followed sets, wherein the interest model is used to characterize a corresponding relationship between the one or more registered users having the same first followed set and an interest label.

In the above Step S17 of the disclosure, the registered users having different first followed sets are classified into registered user sets corresponding to several first followed sets by analyzing the followed set of each registered user, and a user set label dictionary corresponding to the first followed set is generated through the one or more interest label dictionaries of the registered users in the registered user set so as to determine a corresponding relationship between the first followed set and an interest label.

Step S19: One or more second objects having followed relationship with one or more newly registered users on the information client in the social platform are acquired, and the relationship information between the one or more newly registered users and the one or more second objects is read.

In the above Step S19 of the disclosure, the one or more second objects having followed relationship with one or more newly registered users is determined by reading the followed relationship information of the newly registered user on the social platform.

In the practical applications, the followed relationship may be a friend relationship in Tencent QQ software, or followed relationship in the microblog, or a friend relationship in Renren.

Step S21: A second followed set corresponding to the one or more newly registered users is determined according to the one or more second objects having the followed relationship with the newly registered user.

In the above Step S21 of the disclosure, a second followed set corresponding to the one or more newly registered users is determined by arranging the one or more second objects having the followed relationship with the newly registered user.

Step S23: The second followed set is matched with the interest model to determine one or more recommended interest labels of the one or more newly registered users according to the interest model.

In the above step S23 of the disclosure, a first followed set that is matched with the second followed set corresponding to the one or more newly registered users is acquired by matching the second followed set corresponding to the one or more newly registered users with several first followed sets in the interest model so as to determine the interest label of the newly registered user through the first followed set.

Specifically, through Step S11 to Step S23, the registered users having the same first followed set in the social platform are grouped to acquire the registered user set corresponding to the one or more first followed sets, and the user set label dictionary corresponding to the registered user set is acquired by acquiring the one or more interest label dictionaries of the registered users on the information client. In this way, an interest model with a corresponding relationship between the first followed set and the user set label dictionary is constructed. After acquiring the second followed set corresponding to the one or more newly registered users, the recommendation interest label of the newly registered user may be acquired by matching the second followed set directly with the first followed set in the interest model.

In the practical applications, it is generally believed that the relationship in the social platform reflects the interest similarity of users. Based on different assumptions, we can use different methods to find other users with similar interests to a user in the social platform. Different assumptions apply to different types of social platforms. For example, for Tencent QQ and WeChat, as social platforms which emphasize two-way communication, it may be assumed that the interests between friends are similar. For microblog, as a social platform which emphasizes one-way focus, it may be assumed that users having common followed objects are similar in interest. For example, if two users follow Lei Jun and Huang Zhang, they are likely to be interested in smart phones.

Taking the microblog as an example, the social platform filters the content of the followed lists of the microblog of the registered users on the information client, and filters the followed object in which the number of fans is more than a certain value or filters the followed object in which the number of fans is top-ranked to constitute a first followed set. The followed lists of the microblog of all the registered users are filtered in the same way of filtering to acquire one or more first followed sets corresponding to each registered user. The registered users having the same first followed set are classified as several registered user sets, and each registered user set has a different first followed set. The user set label dictionary corresponding to each registered user set is acquired by collecting the one or more interest label dictionaries of the one or more registered users in the registered user set. After a newly registered user registers the information client and authorizes the information client to call the microblog public data, the followed lists of the new user are also filtered in the same way. The filtered the second followed set is matched with the first followed set of several registered users to determine the registered user set to which the new user belongs and to acquire the user set label dictionary corresponding to the registered user set, that is, the one or more recommended interest labels of the one or more newly registered users.

In view of the above, the embodiments of the disclosure solve the problem in the traditional art that targeted information cannot be provided because a newly registered user has no historical browsing record. The effect is achieved for providing targeted information for users through the followed relationship of the newly registered users in the social platform.

Figure 2:
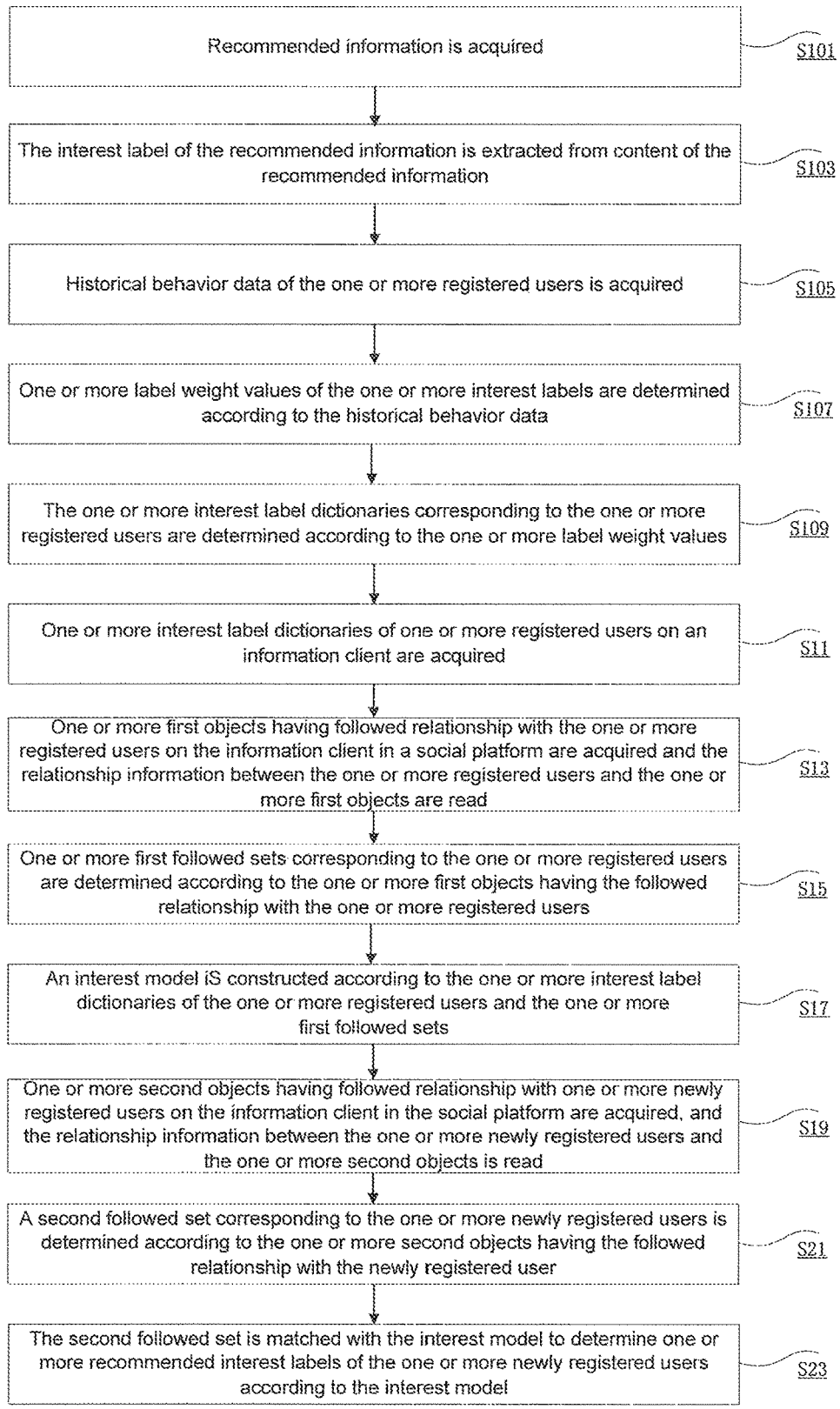
FIG. 2 is a flow diagram of a preferred social platform-based data mining according to a first embodiment of the disclosure.

Preferably, as shown in FIG. 2, in the preferred embodiment provided by the disclosure, before acquiring the one or more interest label dictionaries of the one or more registered users on the information client in Step S11, the method includes the following steps.

Step S101: Recommended information is acquired.

Step S103: The interest label of the recommended information is extracted from content of the recommended information.

Step S105: Historical behavior data of the one or more registered users is acquired, wherein the historical behavior data is used to record operational behavior of the one or more registered users for the recommended information.

Step S107: One or more label weight values of the one or more interest labels are determined according to the historical behavior data.

Step S109: The one or more interest label dictionaries corresponding to the one or more registered users are determined according to the one or more label weight values.

Specifically, the contents of all the recommended information in the information client are analyzed through Step S101 to Step S109, and the interest label is extracted for each piece of recommended information according to the contents of the recommended information. When the one or more registered users operates the recommended information, the operation behavior of the one or more registered users is recorded. The interest label corresponding to the recommended information is subjected to weighted calculation according to the operation behavior of the recommended information, and the weight value of the one or more interest labels corresponding to the one or more registered users is acquired by calculation. When the label weight value is greater than the threshold, the label is added to the one or more interest label dictionaries corresponding to that user.

In the practical applications, the recommended service in the information client will provide an interest label for the recommended content in the information client, for example: the classification of content: science and technology, football, basketball, etc.; the classification of the corresponding people: technical indoorsmen, outdoor enthusiasts, adolescents, etc.; keywords for content: iPhone, tank contest, Bayern Munich and so on. These interest labels are sometimes artificially edited, and are sometimes identified by the algorithm automatically analyzing the recommended information.

In the case that all the recommended information that the recommended service may recommend has interest labels, the one or more interest label dictionaries of the user by recording the behavior data of the one or more registered users using the recommended service, such as browsing content, click/collection/comment content, etc., and according to the interest label corresponding to the information content. This interest label dictionary describes what interest labels the user has, and how much is the weight of each interest label. This interest label dictionary may be used as an interest model in subsequent steps.

Specifically, the calculation method of the label weight value of the one or more interest labels may include the following content.

First of all, a weight w is set for each user act, such as keeping 1 score for click, keeping −0.2 score for browse without click, and keeping 5 scores for collection.

Given a user act sequence [act1, act2, . . . , act3], the interest label weight value of the user is calculated as follows:

$$V=\Sigma_i Ti \cdot wi$$

wherein Ti denotes the interest label vector of the i-th user act, and wi denotes the weight of the i-th user act.

In an example embodiment provided by the disclosure, the step of constructing the interest model according to the one or more interest label dictionaries of the one or more registered users and the first followed set in Step S17 includes the following steps.

Step S171: The first followed set is filtered to acquire a third followed set corresponding to the one or more registered users, wherein the filtering method at least includes a data filtering method, an index filtering method, a condition filtering method, and an information filtering method.

Step S173: The one or more registered users is matched based on the third followed set to generate a registered user set, wherein the registered user set includes the one or more registered users having the same third followed set.

Step S175: A user set label dictionary corresponding to the registered user set is generated according to the one or more interest label dictionaries of the one or more registered users included in the registered user set.

Specifically, the first followed set of the one or more registered users is first filtered through Step S171 to Step S175. The first followed set may be filtered according to the number of followers and/or the number of friends and/or the degree of activity and other conditions. The users who are not active and have fewer friends are removed from the first followed set to generate a filtered third followed set.

The filtered registered users are matched through the third followed set. The registered users in which the matching degree of the third followed set is greater than the pre-set threshold or the third followed set is the same are classified into the same registered user set. According to the content difference of the third followed set, there may be many registered user sets. Of course, the third followed set can also be defined artificially, and the third followed set defined artificially groups the registered users into different registered user sets.

The user set label dictionary corresponding to the currently registered user set is generated according to the content of the one or more interest label dictionaries corresponding to each registered user among the registered user sets.

Figure 3:
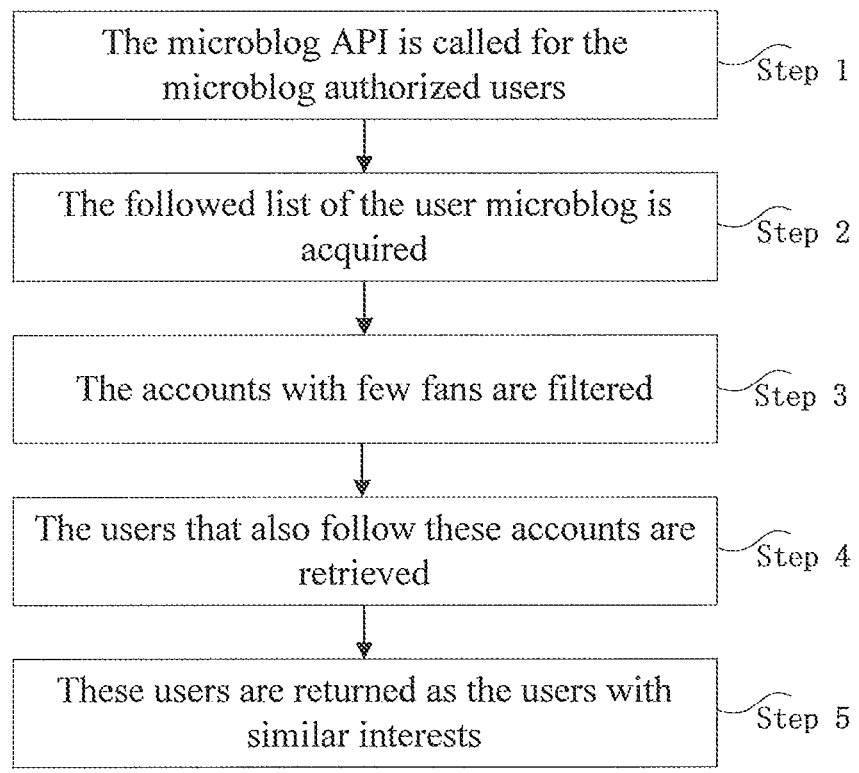
FIG. 3 is a flow schematic diagram of matching the registered users through the followed set in the microblog to generate a registered user set.

The above social platform takes the microblog as an example. As shown in FIG. 3, FIG. 3 is a flow schematic diagram of matching the registered users through the followed set in the microblog to generate a registered user set.

The users with fewer fans in the followed list are filtered by acquiring the followed list of registered users and taking the number of fans as a filtering condition. A third followed set is generated according to the filtered followed list. Of course, for the microblog, the third followed set can also be artificially defined. For example, the specific users in the microblog are classified in accordance with the user category. The users in the field of computer internet such as Li Kaifu, Lei Jun, Zhou Hongyi, and Li Yanhong may be classified into a third followed set, the users in the field of entertainment media such as He Jiong, Xie Na, Dai Jun may be classified into a third followed set, and the users in the field of sports such as Wei Kexing, Li Na, Liu Xiang may be classified into a third followed set.

According to the third followed set, the registered users are classified and the registered users who have a common third followed set are divided into a registered user set to achieve the purpose of user groups of similar interest.

In an example embodiment provided by the disclosure, the step of generating a user set label dictionary corresponding to the registered user set according to the one or more interest label dictionaries of the one or more registered users included in the registered user set in Step S175 includes the following steps.

Step S1751: A first user amount of the registered users on the information client and a second user amount of the registered user set are acquired.

Step S1753: A weight distribution average value of each of the interest labels is calculated according to the one or more label weight values and a first user amount.

Step S1755: A set weight average value of each of the interest labels in the user set interest label dictionary is calculated according to the one or more label weight values and a second user amount of the one or more registered users in the registered user set.

Step S1757: A registered user set weight value of the one or more interest labels in the user set interest label dictionary is calculated according to the weight distribution average value and the set weight average value.

Step S1759: The registered user set weight value of the one or more interest labels in the user set interest label dictionary is successively compared with a preset noise threshold.

The interest label corresponding to the registered user set weight value is retained in the user set label dictionary when the registered user set weight value of the one or more interest labels in the user set interest label dictionary is greater than the preset noise threshold.

The interest label corresponding to the registered user set weight value is deleted in the user set label dictionary when the registered user set weight value of the one or more interest labels in the user set interest label dictionary is less than or equal to the preset noise threshold.

Specifically, in the practical applications of Step S1751 to Step S1759, the social platform takes the microblog as an example. After finding a user group of similar interest, the interest label dictionarys of these user individuals may be combined to acquire a group interest model. The easiest way is to add the user label vectors directly. But in the practical applications, it is found that this way will result in a lot of noise because there are many followers for big microblog IDs in some fields, and many people just follow since the big ID is famous so that the following behavior itself cannot reflect their own interests. If the interest label vectors of these users are simply added, the meaningful signal is easily flooded with general interest. In the case of the actual experiment, it is found by analyzing the microblog users who follow Wang Xing (founder of Meituan) that the maximum weight interest labels are not "Internet" or "O2O", but are "entertainment" and "social news". This is because "entertainment" and "social news" are common interest labels. Many users with these two labels follow Wang Xing because he is the founder of Meituan, but do not follow "Internet" and "O2O" so much in fact. In the end, if we consider all these users indiscriminately, the result will be acquired that the weight of "entertainment" and "social news" is higher than that of "Internet" and "O2O".

How to remove background noise is the core technology of effectively mining the group interest. In practice, we first need to count the weight distribution average value of the registered users in all the websites:

$$V_{base} = \frac{1}{N}\sum V_n;$$

where N denotes the number of all registered users, and $V_n$ denotes the interest label weight distribution of a user.

By the above formula, the weight distribution average value $V_{base}[i]$ of all the users on the interest label i is further acquired.

Then for the registered user set having a same condition in the followed relationship (for example, in the microblog, the set of registered users who follow "Wang Xing" in all the followed sets), the interest label vector V is given to the registered user set group so as to acquire the registered user set weight value V' for removing the noise, respectively:

$$V'[i]=V[i]/V_{base}[i];$$

where V'[i] denotes the registered user set weight value of the interest label i, V[i] denotes the set weight average value of the interest label i, $V_{base}[i]$ denotes the weight distribution average value of all the users on the interest label i.

By comparing the registered user set weight value V' with a preset noise threshold, when the registered user set weight value V' is smaller than the noise threshold, it is proved that the interest label is a noise label, and should be removed from the current user set label dictionary; and when the registered user set weight value V' is equal to or greater than the noise threshold, it is judged that the interest label is a non-noise label and the label is retained in the current user set label dictionary.

Preferably, in the preferred embodiment provided by the disclosure, the step of matching the second followed set with the interest model to determine one or more recommended interest labels of the one or more newly registered users according to the interest model in Step S23 includes the following steps.

Step S231: The second followed set is filtered to acquire a fourth followed set corresponding to the one or more newly registered users, wherein the filtering method at least includes a data filtering method, an index filtering method, a condition filtering method, and an information filtering method.

Step S233: The fourth followed set is matched with the third followed set to determine the registered user set corresponding to the one or more newly registered users.

Step S235: The one or more recommended interest labels of the one or more newly registered users is determined according to the user set label dictionary of the registered user set corresponding to the one or more newly registered users.

Specifically, the second followed set of the one or more registered users is first filtered through Step S231 to Step S235. The second followed set may be filtered according to the number of followers and/or the number of friends and/or the degree of activity and other conditions. The users who are not active and have fewer friends are removed from the second followed set to generate a filtered fourth followed set. Herein the filtering method may be the same as the filtering method used in Sep 171, and other filtering methods may also be used. The filtering method used is not limited as long as the purpose of optimizing the second followed set may be achieved.

Then the fourth followed set is matched with each of the third followed sets. When the matching degree of the fourth followed set corresponding to the one or more newly registered users and the third followed set is greater than the preset threshold or the third followed set is exactly the same, it is determined that the newly registered user is matched with the third followed set so as to determine the registered user set to which the newly registered user belongs.

The recommendation label recommended for the new user is determined according to the user set label dictionary of the registered user set to which the newly registered user belongs.

In the practical applications, after mining a group interest model of a user group having similar interest to that of the newly registered users, we can integrate the group interest model and the user individual interest model according to a certain weight, and then recommend the content according to the integrated interest model. Specifically, given an integrated interest model (interest label vector), we can recommend some of the highest quality content under the label according to the ratio such as the weight of each interest label.

It is to be noted that, for a new user, we cannot acquire the individual interest model of the new user without any of the act data of the user in the station. But if the new user logs in the information client with a network account of the social platform, we can acquire the social relations of the newly registered user on the social platform. The targeted recommended information may be achieved by mining the user group having similar interest within the station and using this group interest model to recommend content to users. In practice, this practice has a better effect than randomly recommending or recommending the most popular content.

Preferably, in the preferred embodiment provided by the disclosure, after matching the second followed set with the interest model to determine one or more recommended interest labels of the one or more newly registered users according to the interest model in Step S23, the method further includes the following step.

Step S24: The recommended information is pushed for the one or more newly registered users according to the one or more recommendation interest labels.

Specifically, through Step S24, the recommended information matching the interest label is pushed for the newly registered user according to the interest label determined for the newly registered user through the above steps.

As may be seen from the technical solution, the embodiments of the disclosure effectively combine the SNS public data and the recommended service private data together as the user recommended content. Compared with using only the SNS public data or the recommended service private data, the integration of the two data is conducive to more accurately recommending personalized content. Moreover, the integrating method proposed by the embodiments of the disclosure can also utilize the integration of the two data (the in-station user interest model based on the in-station data mining is transferred to the newly registered off-station user through the social relationship), which is also the effect that the traditional method cannot achieve.

One feature of the embodiments of the disclosure is that if the recommended service provider has more users, the effect of this method is the better. Because the user group of such a service provider has a relatively large coverage for user groups of the SNS. The situation will not occur that a use randomly gives a social account and most of his/her friends or fans are not users in the station so that the group interest cannot be mined. This is a significant competitive advantage for products such as headlines today that have 100 million users, but it is a technical barrier for some smaller recommended products.

Embodiment 2

Figure 4:
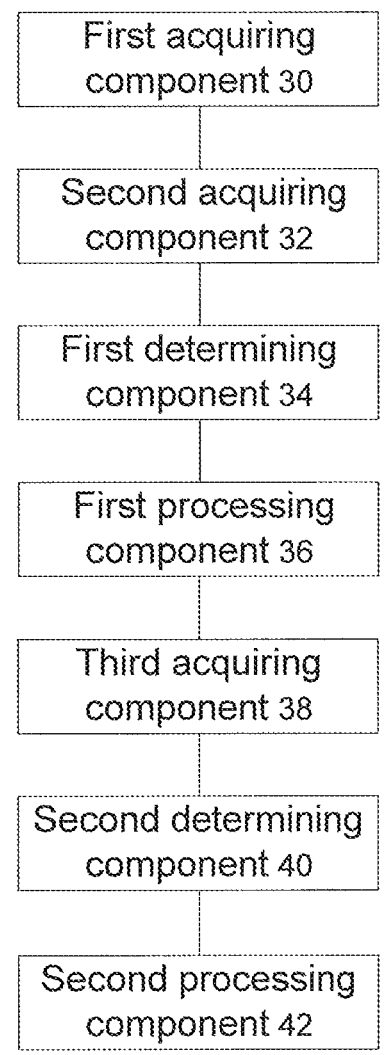
FIG. 4 is a structure schematic diagram of a device for social platform-based data mining according to a second embodiment of the disclosure.

The embodiment of the disclosure further provides a device for social platform-based data mining. As shown in FIG. 4, the device includes a first acquiring component 30, a second acquiring component 32, a first determining component 34, a first processing component 36, a third acquiring component 38, a second determining component 40, and a second processing component 42.

Herein the first acquiring component 30 is arranged to acquire one or more interest label dictionaries of one or more registered users on an information client.

The first acquiring component 30 of the disclosure is arranged to analyze and acquire the one or more interest label dictionaries corresponding to each registered user by collecting the history browsing behavior of the one or more registered users.

The second acquiring component 32 is arranged to acquire one or more first objects having followed relationship with the one or more registered users on the information client in a social platform and read the relationship information between the one or more registered users and the one or more first objects.

The second acquiring component 32 of the disclosure is arranged to determine the object having followed relationship with the one or more registered users by reading the followed relationship information of the one or more registered users on the social platform.

In the practical applications, the followed relationship may be a friend relationship in Tencent QQ software, or followed relationship in the microblog, or a friend relationship in Renren.

The first determining component 34 is arranged to determine one or more first followed sets corresponding to the one or more registered users according to the one or more first objects having the followed relationship with the one or more registered users.

The first determining component 34 of the disclosure is arranged to determine a first followed set of each registered user arranging the one or more first objects having the followed relationship with each registered user.

The first processing component 36 is arranged to construct an interest model according to the one or more interest label dictionaries of the one or more registered users and the one or more first followed sets, wherein the interest model is used to characterize a corresponding relationship between the one or more registered users having the same first followed set and an interest label.

The first processing component 36 of the disclosure is arranged to classify the registered users having different first followed sets into registered user sets corresponding to several first followed sets by analyzing the followed set of each registered user, and generate a user set label dictionary corresponding to the first followed set through the one or more interest label dictionaries of the registered users in the registered user set so as to determine a corresponding relationship between the first followed set and an interest label.

The third acquiring component 38 is arranged to acquire one or more second objects having followed relationship with one or more newly registered users on the information client in the social platform, and read the relationship information between the one or more newly registered users and the one or more second objects.

The third acquiring component 38 of the disclosure is arranged to determine the one or more second objects having followed relationship with one or more newly registered users by reading the followed relationship information of the newly registered user on the social platform.

In the practical applications, the followed relationship may be a friend relationship in Tencent QQ software, or followed relationship in the microblog, or a friend relationship in Renren.

The second determining component 40 is arranged to determine a second followed set corresponding to the one or more newly registered users according to the one or more second objects having the followed relationship with the newly registered user.

The second determining component 40 of the disclosure is arranged to determine a second followed set corresponding to the one or more newly registered users by arranging the one or more second objects having the followed relationship with the newly registered user.

The second processing component 42 is arranged to match the second followed set with the interest model to determine one or more recommended interest labels of the one or more newly registered users according to the interest model.

The second processing component 42 of the disclosure is arranged to acquire a first followed set that is matched with the second followed set corresponding to the one or more newly registered users by matching the second followed set corresponding to the one or more newly registered users with several first followed sets in the interest model so as to determine the interest label of the newly registered user through the first followed set.

Specifically, through the first acquiring component 30, the second acquiring component 32, the first determining component 34, the first processing component 36, the third acquiring component 38, the second determining component 40, and the second processing component 42, the registered users having the same first followed set in the social platform are grouped to acquire the registered user set corresponding to the one or more first followed sets, and the user set label dictionary corresponding to the registered user set is acquired by acquiring the one or more interest label dictionaries of the registered users on the information client. In this way, an interest model with a corresponding relationship between the first followed set and the user set label dictionary is constructed. After acquiring the second followed set corresponding to the one or more newly registered users, the recommendation interest label of the newly registered user may be acquired by matching the second followed set directly with the first followed set in the interest model.

In the practical applications, it is generally believed that the relationship in the social platform reflects the interest similarity of users. Based on different assumptions, we can use different methods to find other users with similar interests to a user in the social platform. Different assumptions apply to different types of social platforms. For example, for Tencent QQ and WeChat, as social platforms which emphasize two-way communication, it may be assumed that the interests between friends are similar. For microblog, as a social platform which emphasizes one-way focus, it may be assumed that users having common followed objects are similar in interest. For example, if two users follow Lei Jun and Huang Zhang, they are likely to be interested in smart phones.

Taking the microblog as an example, the social platform filters the content of the followed lists of the microblog of the registered users on the information client, and filters the followed object in which the number of fans is more than a certain value or filters the followed object in which the number of fans is top-ranked to constitute a first followed set. The followed lists of the microblog of all the registered users are filtered in the same way of filtering to acquire one or more first followed sets corresponding to each registered user. The registered users having the same first followed set are classified as several registered user sets, and each registered user set has a different first followed set. The user set label dictionary corresponding to each registered user set is acquired by collecting the one or more interest label dictionaries of the one or more registered users in the registered user set. After a newly registered user registers the information client and authorizes the information client to call the microblog public data, the followed lists of the new user are also filtered in the same way. The filtered the second followed set is matched with the first followed set of several registered users to determine the registered user set to which the new user belongs and to acquire the user set label dictionary corresponding to the registered user set, that is, the one or more recommended interest labels of the one or more newly registered users.

In view of the above, the embodiments of the disclosure solve the problem in the traditional art that targeted information cannot be provided because a newly registered user has no historical browsing record. The effect is achieved for providing targeted information for users through the followed relationship of the newly registered users in the social platform.

Figure 5:
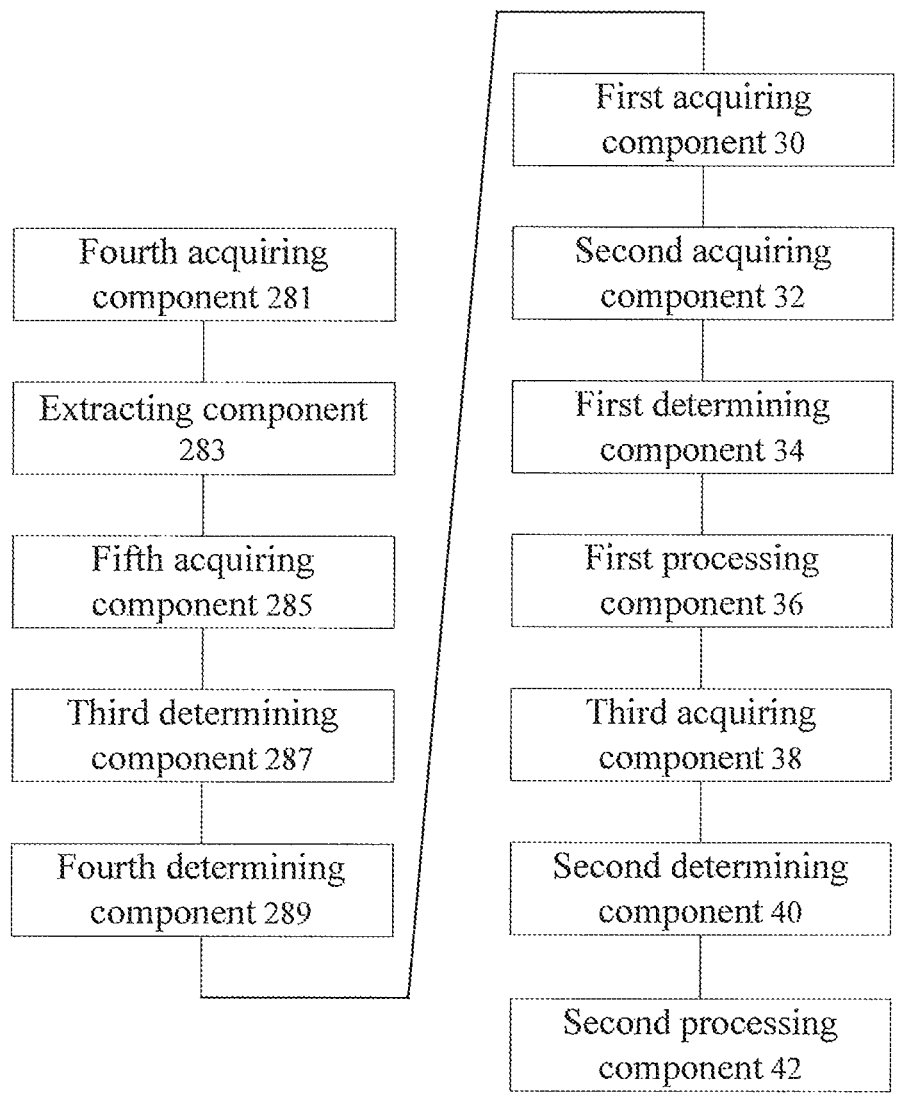
FIG. 5 is a structure schematic diagram of a preferred device for social platform-based data mining according to a second embodiment of the disclosure.

Preferably, in the preferred embodiment provided by the disclosure, as shown in FIG. 5, the device further includes a fourth acquiring component 281, an extracting component 283, a fifth acquiring component 285, a third determining component 287, and a fourth determining component 289.

Herein the fourth acquiring component 281 is arranged to acquire recommended information.

The extracting component 283 is arranged to extract one or more interest labels of the recommended information from content of the recommended information.

The fifth acquiring component 285 is arranged to acquire historical behavior data of the one or more registered users, wherein the historical behavior data is used to record operational behavior of the one or more registered users for the recommended information.

The third determining component 287 is arranged to determine one or more label weight values of the one or more interest labels according to the historical behavior data.

The fourth determining component 289 is arranged to determine the one or more interest label dictionaries corresponding to the one or more registered users according to the one or more label weight values.

Specifically, through the fourth acquiring component 281, the extracting component 283, the fifth acquiring component 285, the third determining component 287, and the fourth determining component 289, the contents of all the recommended information in the information client are analyzed, and the interest label is extracted for each piece of recommended information according to the contents of the recommended information. When the one or more registered users operates the recommended information, the operation behavior of the one or more registered users is recorded. The interest label corresponding to the recommended information is subjected to weighted calculation according to the operation behavior of the recommended information, and the weight value of the one or more interest labels corresponding to the one or more registered users is acquired by calculation. When the label weight value is greater than the threshold, the label is added to the one or more interest label dictionaries corresponding to that user.

In the practical applications, the recommended service in the information client will provide an interest label for the recommended content in the information client, for example: the classification of content: science and technology, football, basketball, etc.; the classification of the corresponding people: technical indoorsmen, outdoor enthusiasts, adolescents, etc.; keywords for content: iPhone, tank contest, Bayern Munich and so on. These interest labels are sometimes artificially edited, and are sometimes identified by the algorithm automatically analyzing the recommended information.

In the case that all the recommended information that the recommended service may recommend has interest labels, the one or more interest label dictionaries of the user by recording the behavior data of the one or more registered users using the recommended service, such as browsing content, click/collection/comment content, etc., and according to the interest label corresponding to the information content. This interest label dictionary describes what interest labels the user has, and how much is the weight of each interest label. This interest label dictionary may be used as an interest model in subsequent steps.

Specifically, the calculation method of the label weight value of the one or more interest labels may include the following content.

First of all, a weight w is set for each user act, such as keeping 1 score for click, keeping -0.2 score for browse without click, and keeping 5 scores for collection.

Given a user act sequence [act1, act2, act3], the interest label weight value of the user is calculated as follows:

$$V = \Sigma_i Ti \cdot wi$$

where Ti denotes the interest label vector of the i-th user act, and wi denotes the weight of the i-th user act.

Preferably, in the preferred embodiment provided by the disclosure, the first processing component 36 includes a first sub-processing component 361, a sub-matching component 363, and a first generating component 365.

Herein the first sub-processing component 361 is arranged to perform filtering in the first followed set to acquire a third followed set corresponding to the one or more registered users, wherein the filtering method at least includes a data filtering method, an index filtering method, a condition filtering method, and an information filtering method.

The sub-matching component 363 is arranged to match the one or more registered users based on the third followed set to generate a registered user set, wherein the registered user set includes the one or more registered users having the same third followed set.

The first generating component 365 is arranged to generate a user set label dictionary corresponding to the registered user set according to the one or more interest label dictionaries of the one or more registered users included in the registered user set.

Specifically, through the first sub-processing component 361, the sub-matching component 363, and the first generating component 365, the first followed set of the one or more registered users is first filtered. The first followed set may be filtered according to the number of followers and/or the number of friends and/or the degree of activity and other conditions. The users who are not active and have fewer friends are removed from the first followed set to generate a filtered third followed set.

The filtered registered users are matched through the third followed set. The registered users in which the matching degree of the third followed set is greater than the pre-set threshold or the third followed set is the same are classified into the same registered user set. According to the content difference of the third followed set, there may be many registered user sets. Of course, the third followed set can also be defined artificially, and the third followed set defined artificially groups the registered users into different registered user sets.

The user set label dictionary corresponding to the currently registered user set is generated according to the content of the one or more interest label dictionaries corresponding to each registered user among the registered user sets.

The above social platform takes the microblog as an example. As shown in FIG. 3, FIG. 3 is a flow schematic diagram of matching the registered users through the followed set in the microblog to generate a registered user set.

The users with fewer fans in the followed list are filtered by acquiring the followed list of registered users and taking the number of fans as a filtering condition. A third followed set is generated according to the filtered followed list. Of course, for the microblog, the third followed set can also be artificially defined. For example, the specific users in the microblog are classified in accordance with the user category. The users in the field of computer internet such as Li Kaifu, Lei Jun, Zhou Hongyi, and Li Yanhong may be classified into a third followed set, the users in the field of entertainment media such as He Jiong, Xie Na, Dai Jun may be classified into a third followed set, and the users in the field of sports such as Wei Kexing, Li Na, Liu Xiang may be classified into a third followed set.

According to the third followed set, the registered users are classified and the registered users who have a common third followed set are divided into a registered user set to achieve the purpose of user groups of similar interest.

In an example embodiment provided by the disclosure, the first generating component 365 includes a first acquiring sub-component 3651, a first calculating sub-component 3652, a second calculating sub-component 3653, a third calculating sub-component 3654, and a judging sub-component 3655.

Herein the first acquiring sub-component 3651 is arranged to acquire a first user amount of the registered users on the information client and a second user amount of the registered user set.

The first calculating sub-component 3652 is arranged to calculate a weight distribution average value of each of the interest labels according to the one or more label weight values and a first user amount.

The second calculating sub-component 3653 is arranged to calculate a set weight average value of each of the interest labels in the user set interest label dictionary according to the one or more label weight values and a second user amount of the one or more registered users in the registered user set.

The third calculating sub-component 3654 is arranged to calculate a registered user set weight value of the one or more interest labels in the user set interest label dictionary according to the weight distribution average value and the set weight average value.

The judging sub-component 3655 is arranged to successively compare the registered user set weight value of the one or more interest labels in the user set interest label dictionary with a preset noise threshold.

The interest label corresponding to the registered user set weight value is retained in the user set label dictionary when the registered user set weight value of the one or more interest labels in the user set interest label dictionary is greater than the preset noise threshold.

The interest label corresponding to the registered user set weight value is deleted in the user set label dictionary when the registered user set weight value of the one or more interest labels in the user set interest label dictionary is less than or equal to the preset noise threshold.

Specifically, through the first acquiring sub-component 3651, the first calculating sub-component 3652, the second calculating sub-component 3653, the third calculating sub-component 3654, and the judging sub-component 3655, in the practical applications, the social platform takes the microblog as an example. After finding a user group of similar interest, the interest label dictionarys of these user individuals may be combined to acquire a group interest model. The easiest way is to add the user label vectors directly. But in the practical applications, it is found that this way will result in a lot of noise because there are many followers for big microblog IDs in some fields, and many people just follow since the big ID is famous so that the following behavior itself cannot reflect their own interests. If the interest label vectors of these users are simply added, the meaningful signal is easily flooded with general interest. In the case of the actual experiment, it is found by analyzing the microblog users who follow Wang Xing (founder of Meituan) that the maximum weight interest labels are not "Internet" or "O2O", but are "entertainment" and "social news". This is because "entertainment" and "social news" are common interest labels. Many users with these two labels follow Wang Xing because he is the founder of Meituan, but do not follow "Internet" and "O2O" so much in fact. In the end, if we consider all these users indiscriminately, the result will be acquired that the weight of "entertainment" and "social news" is higher than that of "Internet" and "O2O".

How to remove background noise is the core technology of effectively mining the group interest. In practice, we first need to count the weight distribution average value of the registered users in all the websites:

$$V_{base} = \frac{1}{N} \sum V_n;$$

where N denotes the number of all registered users, and $V_n$ denotes the interest label weight distribution of a user.

By the above formula, the weight distribution average value $V_{base}[i]$ of all the users on the interest label i is further acquired.

Then for the registered user set having a same condition in the followed relationship (for example, in the microblog, the set of registered users who follow "Wang Xing" in all the followed sets), the interest label vector V is given to the registered user set group so as to acquire the registered user set weight value V' for removing the noise, respectively:

$$V'[i]=V[i]/V_{base}[i];$$

where V'[i] denotes the registered user set weight value of the interest label i, V[i] denotes the set weight average value of the interest label i, $V_{base}[i]$ denotes the weight distribution average value of all the users on the interest label i.

By comparing the registered user set weight value V' with a preset noise threshold, when the registered user set weight value V' is smaller than the noise threshold, it is proved that the interest label is a noise label, and should be removed from the current user set label dictionary; and when the registered user set weight value V' is equal to or greater than the noise threshold, it is judged that the interest label is a non-noise label and the label is retained in the current user set label dictionary.

By comparing the registered user set weight value V' with a preset noise threshold, when the registered user set weight value V' is smaller than the noise threshold, it is proved that the interest label is a noise label, and should be removed from the current user set label dictionary; and when the registered user set weight value V' is equal to or greater than the noise threshold, it is judged that the interest label is a non-noise label and the label is retained in the current user set label dictionary.

Preferably, in the preferred embodiment provided by the disclosure, the second processing component 42 includes a second processing sub-component 421, a first determining sub-component 423, and a second determining sub-component 425.

Herein the second processing sub-component 421 is arranged to perform filtering in the second followed set to acquire a fourth followed set corresponding to the one or more newly registered users, wherein the filtering device at least includes a data filtering method, an index filtering method, a condition filtering method, and an information filtering method.

The first determining sub-component 423 is arranged to match the fourth followed set with the third followed set to determine the registered user set corresponding to the one or more newly registered users.

The second determining sub-component 425 is arranged to determine the one or more recommended interest labels of the one or more newly registered users according to the user set label dictionary of the registered user set corresponding to the one or more newly registered users.

Specifically, through the second processing sub-component 421, the first determining sub-component 423, and the second determining sub-component 425, the second followed set of the registered user is first filtered. The second followed set may be filtered according to the number of followers and/or the number of friends and/or the degree of activity and other conditions. The users who are not active and have fewer friends are removed from the second followed set to generate a filtered fourth followed set. Herein the filtering method may be the same as the filtering method used in Sep 171, and other filtering methods may also be used. The filtering method used is not limited as long as the purpose of optimizing the second followed set may be achieved.

Then the fourth followed set is matched with each of the third followed sets. When the matching degree of the fourth followed set corresponding to the one or more newly registered users and the third followed set is greater than the preset threshold or the third followed set is exactly the same, it is determined that the newly registered user is matched with the third followed set so as to determine the registered user set to which the newly registered user belongs.

The recommendation label recommended for the new user is determined according to the user set label dictionary of the registered user set to which the newly registered user belongs.

In the practical applications, after mining a group interest model of a user group having similar interest to that of the newly registered users, we can integrate the group interest model and the user individual interest model according to a certain weight, and then recommend the content according to the integrated interest model. Specifically, given an integrated interest model (interest label vector), we can recommend some of the highest quality content under the label according to the ratio such as the weight of each interest label.

It is to be noted that, for a new user, we cannot acquire the individual interest model of the new user without any of the act data of the user in the station. But if the new user logs in the information client with a network account of the social platform, we can acquire the social relations of the newly registered user on the social platform. The targeted recommended information may be achieved by mining the user group having similar interest within the station and using this group interest model to recommend content to users. In practice, this practice has a better effect than randomly recommending or recommending the most popular content.

Figure 6:
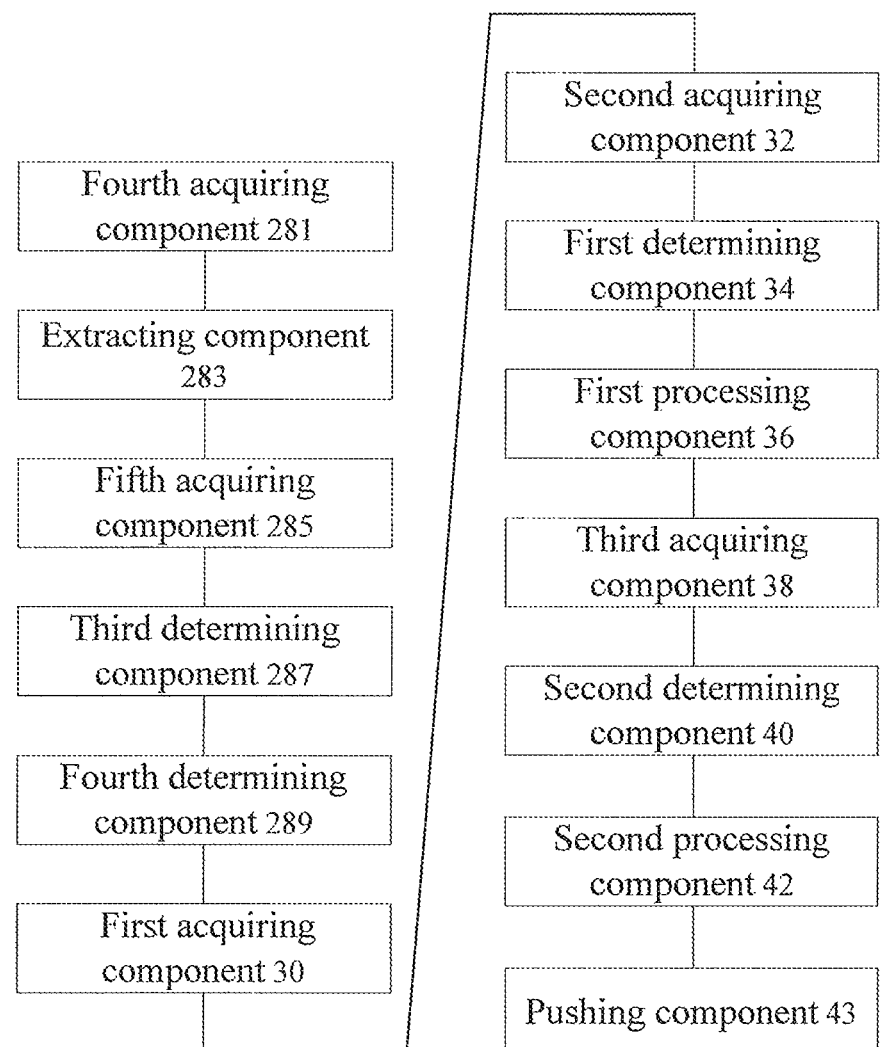
FIG. 6 is a structure schematic diagram of a preferred device for social platform-based data mining according to a second embodiment of the disclosure.

Preferably, in the preferred embodiment provided by the disclosure, as shown in FIG. 6, the device further includes a pushing component 43.

Herein the pushing component 43 is arranged to push the recommended information for the one or more newly registered users according to the one or more recommendation interest labels.

Specifically, through the pushing component 43, the recommended information matching the interest label is pushed for the newly registered user according to the interest label determined for the newly registered user through the above steps.

As may be seen from the technical solution, the embodiments of the disclosure effectively combine the SNS public data and the recommended service private data together as the user recommended content. Compared with using only the SNS public data or the recommended service private data, the integration of the two data is conducive to more accurately recommending personalized content. Moreover, the integrating method proposed by the embodiments of the disclosure can also utilize the integration of the two data (the in-station user interest model based on the in-station data mining is transferred to the newly registered off-station user through the social relationship), which is also the effect that the traditional method cannot achieve.

One feature of the embodiments of the disclosure is that if the recommended service provider has more users, the effect of this method is the better. Because the user group of such a service provider has a relatively large coverage for user groups of the SNS. The situation will not occur that a use randomly gives a social account and most of his/her friends or fans are not users in the station so that the group interest cannot be mined. This is a significant competitive advantage for products such as headlines today that have 100 million users, but it is a technical barrier for some smaller recommended products.

Each of the functional units provided in the embodiment of the disclosure may be operated in a mobile terminal, a computer terminal or a similar arithmetic device, or may be stored as a part of the storage medium.

Thus, embodiments of the disclosure may provide a computer terminal that may be any of computer terminal devices in a computer terminal group. Optionally, in the present embodiment, the above computer terminal may be replaced with a terminal device such as a mobile terminal.

Optionally, in the present embodiment, the above computer terminal may be located in at least one of the plurality of network devices in the computer network.

In the present embodiment, the above computer terminal may execute the program code of the following steps in the method for social platform-based data mining: acquiring one or more interest label dictionaries of one or more registered users on an information client; acquiring one or more first objects having followed relationship with the one or more registered users on the information client in a social platform and reading the relationship information between the one or more registered users and the one or more first objects; according to the one or more first objects having the followed relationship with the one or more registered users, determining one or more first followed sets corresponding to the one or more registered users; according to the one or more interest label dictionaries of the one or more registered users and the one or more first followed sets, constructing an interest model, wherein the interest model is used to characterize a corresponding relationship between the one or more registered users having the same first followed set and an interest label; acquiring one or more second objects having followed relationship with one or more newly registered users on the information client in the social platform, and reading relationship information between the one or more newly registered users and the one or more second objects; according to the one or more second objects having the followed relationship with the one or more newly registered user, determining a second followed set corresponding to the one or more newly registered users; and matching the second followed set with the interest model to determine one or more recommended interest labels of the one or more newly registered users according to the interest model.

Optionally, the computer terminal may include one or more processors, memories, and transmitting devices.

Herein the memory may be used to store software programs and components, such as program instructions/components corresponding to the method for social platform-based data mining in the embodiments of the disclosure, and the processor performs various function applications and data processing by running software programs and components stored in the memory, that is, achieving the above method for social platform-based data mining. The memory may include a high-speed random access memory, and may include a non-volatile memory such as one or more magnetic storage devices, flash memories, or other non-volatile solid state memories. In some examples, the memory may further include a memory remotely provided with respect to the processor, which may be connected to the terminal via a network. Examples of the above networks include, but are not limited to, the Internet, the intranet, the local area network, the mobile communication network, and combinations thereof.

The above transmitting device is for receiving or transmitting data via a network. The specific example of the above network may include a wired network and a wireless network. In one example, the transmitting device includes a Network Interface Controller (NIC) that may be connected to the router via a network cable and other network devices to communicate with the Internet or the local area network. In one example, the transmitting device is a Radio Frequency (RF) component for wirelessly communicating with the Internet.

Herein specifically, the memory is used for storing information of a preset action condition and a preset privileged user and an application program. The processor may call the information and application program stored in the memory by means of the transmitting device to execute the program code of the method steps of various optional or preferred embodiments in the above method embodiments.

It will be understood by those of ordinary skill in the art that computer terminals may also be terminal devices such as smart phones (such as Android phones, iOS phones, etc.), tablet PCs, palm computers, Mobile Internet Devices (MIDs), and PADs.

It will be understood by those of ordinary skill in the art that all or a part of steps in the various methods of the above embodiments may be accomplished by a program instructing the terminal device related hardware, and the program may be stored in a computer readable storage medium. The storage medium may include: a flash disk, a Read-Only Memory (ROM), a Random Access Memory (RAM), a magnetic disk or an optical disk.

The embodiment of the disclosure also provides a storage medium. Alternatively, in the embodiment, the above storage medium may be used for storing the program code executed by the method for social platform-based data mining provided by the method embodiment described above.

Optionally, in the embodiment, the above storage medium may be located in any of the computer terminals in the computer terminal group in the computer network or in any of the mobile terminals in the mobile terminal group.

Optionally, in the embodiment, the storage medium is arranged to store the program code for performing the following steps: acquiring one or more interest label dictionaries of one or more registered users on an information client; acquiring one or more first objects having followed relationship with the one or more registered users on the information client in a social platform and reading the relationship information between the one or more registered users and the one or more first objects; according to the one or more first objects having the followed relationship with the one or more registered users, determining one or more first followed sets corresponding to the one or more registered users; according to the one or more interest label dictionaries of the one or more registered users and the one or more first followed sets, constructing an interest model, wherein the interest model is used to characterize a corresponding relationship between the one or more registered users having the same first followed set and an interest label; acquiring one or more second objects having followed relationship with one or more newly registered users on the information client in the social platform, and reading relationship information between the one or more newly registered users and the one or more second objects; according to the one or more second objects having the followed relationship with the one or more newly registered user, determining a second followed set corresponding to the one or more newly registered users; and matching the second followed set with the interest model to determine one or more recommended interest labels of the one or more newly registered users according to the interest model.

Optionally, in the present embodiment, the storage medium may also be arranged to store the program code of various preferred or optional method steps provided by the method for social platform-based data mining.

The method for social platform-based data mining according to the embodiments of the disclosure is described in an exemplary manner with reference to the accompanying drawings. However, it will be understood by those skilled in the art that various modifications may be made to the above page layout method and system proposed in the embodiments of the disclosure without departing from the content of the embodiments of the disclosure. Accordingly, the scope of protection of the embodiments of the disclosure should be determined by the content of the appended claims.

The above is only the preferred embodiment of the disclosure and not intended to limit the embodiments of the disclosure, and for the technician of the field, the embodiments of the disclosure may have various modifications and variations. Any modifications, equivalent replacements, improvements and the like within the spirit and principle of the embodiments of the disclosure shall fall within the scope of protection as defined in the embodiments of the disclosure.

The invention claimed is:

1. A method for social platform-based data mining, comprising:
   acquiring, by a computer terminal, one or more interest label dictionaries of one or more registered users on an information client;
   acquiring, by the computer terminal, one or more first objects having followed relationship with the one or more registered users on the information client in a social platform and reading relationship information between the one or more registered users and the one or more first objects;
   according to the one or more first objects having the followed relationship with the one or more registered users, determining, by the computer terminal, one or more first followed sets corresponding to the one or more registered users;
   according to the one or more interest label dictionaries of the one or more registered users and the one or more first followed sets, constructing, by the computer terminal, an interest model, wherein the interest model is used to characterize a corresponding relationship between one or more registered users having the same first followed set and an interest label;
   acquiring, by the computer terminal, one or more second objects having followed relationship with one or more newly registered users on the information client in the social platform, and reading, by the computer terminal, relationship information between the one or more newly registered users and the one or more second objects;
   according to the one or more second objects having the followed relationship with the one or more newly registered user, determining, by the computer terminal, a second followed set corresponding to the one or more newly registered users;
   matching, by the computer terminal, the second followed set with the interest model to determine one or more recommended interest labels of the one or more newly registered users according to the interest model; and
   pushing recommended information to the one or more newly registered users according to the one or more recommendation interest labels.

2. The method as claimed in claim 1, wherein before acquiring the one or more interest label dictionaries of the one or more registered users on the information client, the method comprises:
   acquiring recommended information;
   extracting one or more interest labels of the recommended information from content of the recommended information;
   acquiring historical behavior data of the one or more registered users, wherein the historical behavior data is used to record operational behavior of the one or more registered users for the recommended information;
   determining one or more label weight values of the one or more interest labels according to the historical behavior data; and determining the one or more interest label dictionaries corresponding to the one or more registered users according to the one or more label weight values.

3. The method as claimed in claim 2, wherein constructing the interest model according to the one or more interest label dictionaries of the one or more registered users and the first followed set comprises:
performing filtering in the first followed set to acquire a third followed set corresponding to the one or more registered users, wherein a method for performing filtering in the first followed set comprises at least one of a data filtering method, an index filtering method, a condition filtering method, and an information filtering method;
matching the one or more registered users based on the third followed set to generate a registered user set, wherein the registered user set comprises one or more registered users having the same third followed set; and
generating a user set label dictionary corresponding to the registered user set according to the one or more interest label dictionaries of the one or more registered users comprised in the registered user set.

4. The method as claimed in claim 3, wherein generating the user set label dictionary corresponding to the registered user set according to the one or more interest label dictionaries of the one or more registered users comprised in the registered user set comprises:
acquiring a first user amount of the one or more registered users on the information client and a second user amount of the registered user set;
calculating a weight distribution average value of each of the interest labels according to the one or more label weight values and a first user amount;
calculating a set weight average value of each of the interest labels in a user set interest label dictionary according to the one or more label weight values and a second user amount of the one or more registered users in the registered user set;
calculating a registered user set weight value of the one or more interest labels in the user set interest label dictionary according to the weight distribution average value and the set weight average value;
successively comparing the registered user set weight value of the one or more interest labels in the user set interest label dictionary with a preset noise threshold;
retaining the interest label corresponding to the registered user set weight value in the user set label dictionary when the registered user set weight value of the one or more interest labels in the user set interest label dictionary is greater than the preset noise threshold; and
deleting the interest label corresponding to the registered user set weight value from the user set label dictionary when the registered user set weight value of the one or more interest labels in the user set interest label dictionary is less than or equal to the preset noise threshold.

5. The method as claimed in claim 4, wherein matching the second followed set with the interest model to determine one or more recommended interest labels of the one or more newly registered users according to the interest model comprises:
performing filtering in the second followed set to acquire a fourth followed set corresponding to the one or more newly registered users, wherein the filtering method comprises at least one of a data filtering method, an index filtering method, a condition filtering method, and an information filtering method;
matching the fourth followed set with the third followed set to determine the registered user set corresponding to the one or more newly registered users; and
determining the one or more recommended interest labels of the one or more newly registered users according to the user set label dictionary of the registered user set corresponding to the one or more newly registered users.

6. The method as claimed in claim 5, wherein after matching the second followed set with the interest model to determine one or more recommended interest labels of the one or more newly registered users according to the interest model, the method further comprises:
pushing recommended information for the one or more newly registered users according to the one or more recommendation interest labels.

7. The method as claimed in claim 4, wherein the registered user set weight value V'[i] of the one or more interest labels is determined by the following formula:

$$V'[i]=V[i]/V_{base}[i];$$

where V'[i] denotes the registered user set weight value of an interest label i, V[i] denotes the set weight average value of the interest label i, $V_{base}[i]$ denotes the weight distribution average value of the interest label i.

8. The method as claimed in claim 4, wherein after matching the second followed set with the interest model to determine one or more recommended interest labels of the one or more newly registered users according to the interest model, the method further comprises:
pushing recommended information for the one or more newly registered users according to the one or more recommendation interest labels.

9. The method as claimed in claim 3, wherein after matching the second followed set with the interest model to determine one or more recommended interest labels of the one or more newly registered users according to the interest model, the method further comprises:
pushing recommended information for the one or more newly registered users according to the one or more recommendation interest labels.

10. The method as claimed in claim 2, wherein after matching the second followed set with the interest model to determine one or more recommended interest labels of the one or more newly registered users according to the interest model, the method further comprises:
pushing recommended information for the one or more newly registered users according to the one or more recommendation interest labels.

11. The method as claimed in claim 1, wherein after matching the second followed set with the interest model to determine one or more recommended interest labels of the one or more newly registered users according to the interest model, the method further comprises:
pushing recommended information for the one or more newly registered users according to the one or more recommendation interest labels.

12. A computer terminal for executing the program code of the steps provided by the method for social platform-based data mining as claimed in claim 1.

13. A storage medium for storing the program code executed by the method for social platform-based data mining as claimed in claim 1.

14. A device for social platform-based data mining, comprising a hardware processor configured to execute program units stored on a memory, the program units comprising:

a first acquiring component arranged to acquire one or more interest label dictionaries of one or more registered users on an information client;

a second acquiring component arranged to acquire one or more first objects having followed relationship with the one or more registered users on the information client in a social platform and read the relationship information between the one or more registered users and the one or more first objects;

a first determining component arranged to, according to the one or more first objects having the followed relationship with the one or more registered users, determine one or more first followed sets corresponding to the one or more registered users;

a first processing component arranged to, according to the one or more interest label dictionaries of the one or more registered users and the one or more first followed sets, construct an interest model, wherein the interest model is used to characterize a corresponding relationship between the one or more registered users having the same first followed set and an interest label;

a third acquiring component arranged to acquire one or more second objects having followed relationship with one or more newly registered users on the information client in the social platform, and read relationship information between the one or more newly registered users and the one or more second objects;

a second determining component arranged to, according to the one or more second objects having the followed relationship with the one or more newly registered user, determine a second followed set corresponding to the one or more newly registered users; and a second processing component arranged to match the second followed set with the interest model to determine one or more recommended interest labels of the one or more newly registered users according to the interest model;

the device is further arranged to push recommended information to the one or more newly registered users according to the one or more recommendation interest labels.

15. The device as claimed in claim 14, wherein the device further comprises:

a fourth acquiring component arranged to acquire recommended information;

an extracting component arranged to extract one or more interest labels of the recommended information from content of the recommended information;

a fifth acquiring component arranged to acquire historical behavior data of the one or more registered users, wherein the historical behavior data is used to record operational behavior of the one or more registered users for the recommended information;

a third determining component arranged to determine one or more label weight values of the one or more interest labels according to the historical behavior data; and a fourth determining component arranged to determine the one or more interest label dictionaries corresponding to the one or more registered users according to the one or more label weight values.

16. The device as claimed in claim 15, wherein the first processing component comprises:

a first processing sub-component arranged to perform filtering in the first followed set to acquire a third followed set corresponding to the one or more registered users, wherein a method for performing filtering in the first followed set comprises at least one of a data filtering method, an index filtering method, a condition filtering method, and an information filtering method;

a matching sub-component arranged to match the one or more registered users based on the third followed set to generate a registered user set, wherein the registered user set comprises the one or more registered users having the same third followed set; and a first generating component arranged to generate a user set label dictionary corresponding to the registered user set according to the one or more interest label dictionaries of the one or more registered users comprised in the registered user set.

17. The device as claimed in claim 16, wherein the first generating component comprises:

a first acquiring sub-component arranged to acquire a first user amount of the one or more registered users on the information client and a second user amount of the registered user set;

a first calculating sub-component arranged to calculate a weight distribution average value of each of the interest labels according to the one or more label weight values and a first user amount;

a second calculating sub-component arranged to calculate a set weight average value of each of the interest labels in the user set interest label dictionary according to the one or more label weight values and a second user amount of the one or more registered users in the registered user set;

a third calculating sub-component arranged to calculate a registered user set weight value of the one or more interest labels in the user set interest label dictionary according to the weight distribution average value and the set weight average value; and a judging sub-component arranged to successively compare the registered user set weight value of the one or more interest labels in the user set interest label dictionary with a preset noise threshold;

retaining the interest label corresponding to the registered user set weight value in the user set label dictionary when the registered user set weight value of the one or more interest labels in the user set interest label dictionary is greater than the preset noise threshold; and deleting the interest label corresponding to the registered user set weight value in the user set label dictionary when the registered user set weight value of the one or more interest labels in the user set interest label dictionary is less than or equal to the preset noise threshold.

18. The device as claimed in claim 17, wherein the processing component comprises:

a second processing sub-component arranged to perform filtering in the second followed set to acquire a fourth followed set corresponding to the one or more newly registered users, wherein a method for performing filtering in the first followed set comprises at least one of a data filtering method, an index filtering method, a condition filtering method, and an information filtering method;

a first determining sub-component arranged to match the fourth followed set with the third followed set to determine the registered user set corresponding to the one or more newly registered users; and a second determining sub-component arranged to determine the one or more recommended interest labels of the one or more newly registered users according to the user set label dictionary of the registered user set corresponding to the one or more newly registered users.

19. The device as claimed in claim 17, wherein the registered user set weight value V'[i] of the one or more interest labels is determined by the following formula:

$$V'[i]=V[i]/V_{base}[i];$$

wherein V'[i] denotes the registered user set weight value of an interest label i, V[i] denotes the set weight average value of the interest label i, $V_{base}[i]$ denotes the weight distribution average value of the interest label i.

20. The device as claimed in claim 15, wherein the device further comprises:
a pushing component arranged to push the recommended information for the one or more newly registered users according to the one or more recommendation interest labels.

21. The device as claimed in claim 14, wherein the device further comprises:
a pushing component arranged to push the recommended information for the one or more newly registered users according to the one or more recommendation interest labels.

* * * * *